United States Patent [19]

Stone

[11] 4,326,653
[45] Apr. 27, 1982

[54] VISOR-CONNECTED TAPE CARTRIDGE HOLDER

[76] Inventor: H. Spencer Stone, 11327 Piney Point Cir., Houston, Tex. 77024

[21] Appl. No.: 80,935

[22] Filed: Oct. 1, 1979

Related U.S. Application Data

[63] Continuation-in-part of Ser. No. 913,806, Jun. 8, 1978, abandoned.

[51] Int. Cl.³ .......................... B60R 7/08; B65D 85/67
[52] U.S. Cl. ..................................... 224/312; 24/336; 206/387
[58] Field of Search ..................... 224/312; 206/387; 211/40; 24/3 R, 3 E, 3 L, 81 BA, 84 R, 84 B; 312/8, 12, 111

[56] References Cited

U.S. PATENT DOCUMENTS

| | | | |
|---|---|---|---|
| 2,211,879 | 8/1940 | Lave | 224/312 |
| 3,019,908 | 2/1962 | Theurer | 224/312 |
| 3,635,350 | 1/1972 | Wolf | 211/40 |
| 3,666,337 | 5/1972 | Sztorc | 206/387 X |
| 3,702,132 | 11/1972 | Fites et al. | 206/387 |
| 3,743,081 | 7/1973 | Roberg et al. | 206/387 |
| 3,899,229 | 8/1975 | Ackeret | 206/387 X |
| 3,965,540 | 6/1976 | Moore | 24/84 R |
| 3,995,737 | 12/1976 | Ackeret | 206/387 |
| 4,026,615 | 5/1977 | Tazaki et al. | 312/111 |

FOREIGN PATENT DOCUMENTS

| | | | |
|---|---|---|---|
| 854022 | 10/1970 | Canada | 206/387 |
| 7540 | 7/1979 | European Pat. Off. | 206/387 |

*Primary Examiner*—Stephen Marcus
*Attorney, Agent, or Firm*—Vaden, Eickenroht, Thompson, Bednar & Jamison

[57] ABSTRACT

A holder of preferably slightly flexible plastic having oppositely aligned wedging end pieces for clampingly securing a tape cartridge and suitably structured to clamp onto a vehicle sun visor regardless of the size of such visor. A first embodiment includes front and rear clamping ends and a second embodiment includes side clamping ends. Various embodiments are shown for securing the holder to the visor, for connecting modular holders together and for resiliently accommodating cartridges of different thickness dimensions. One embodiment also includes an auxiliary sun screen, as well.

5 Claims, 16 Drawing Figures

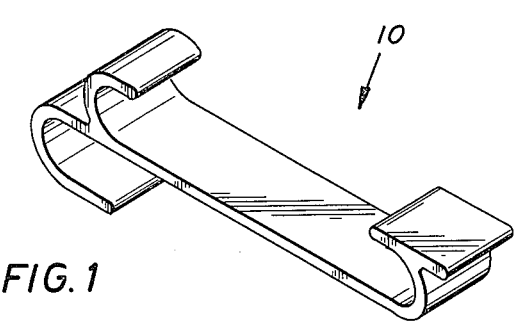
FIG. 1
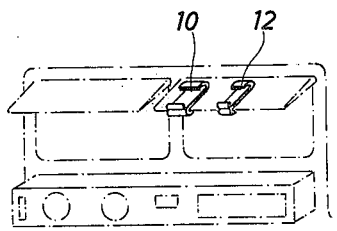
FIG. 2
FIG. 3
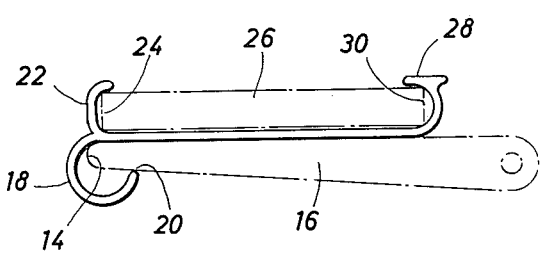
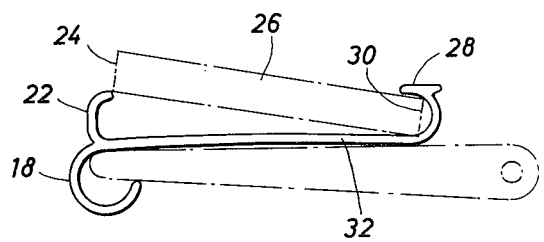
FIG. 4
FIG. 5
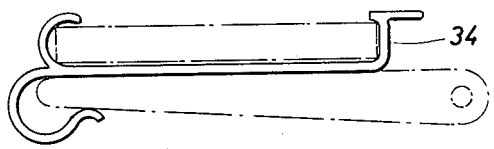
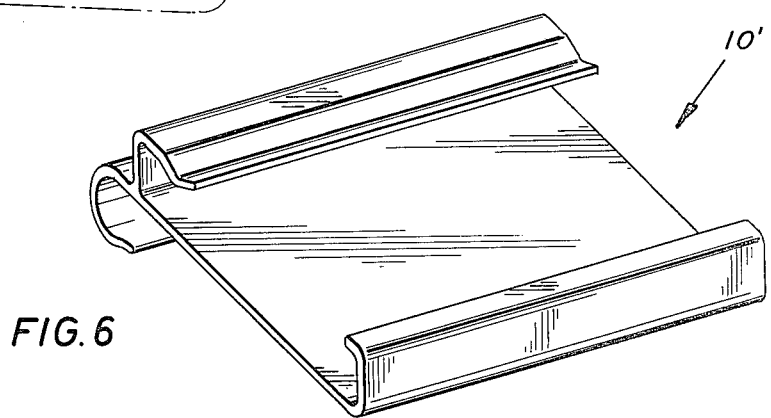
FIG. 6

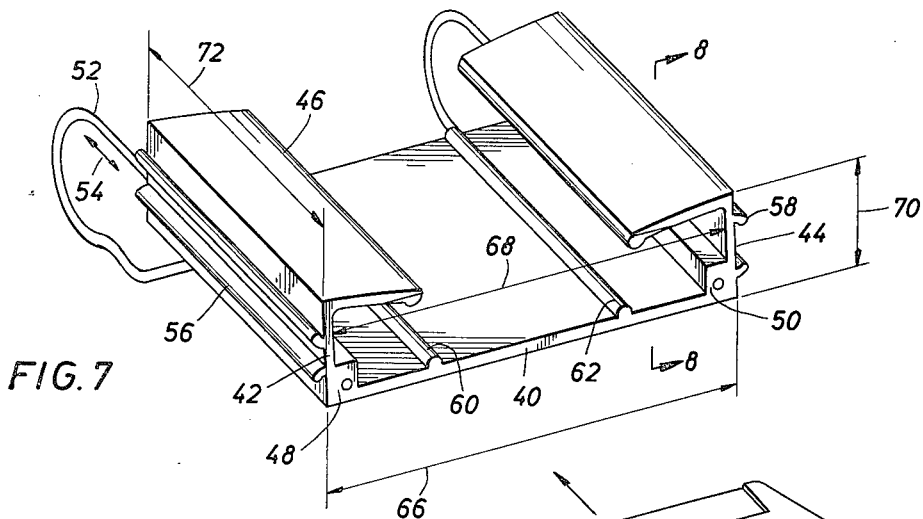
FIG. 7
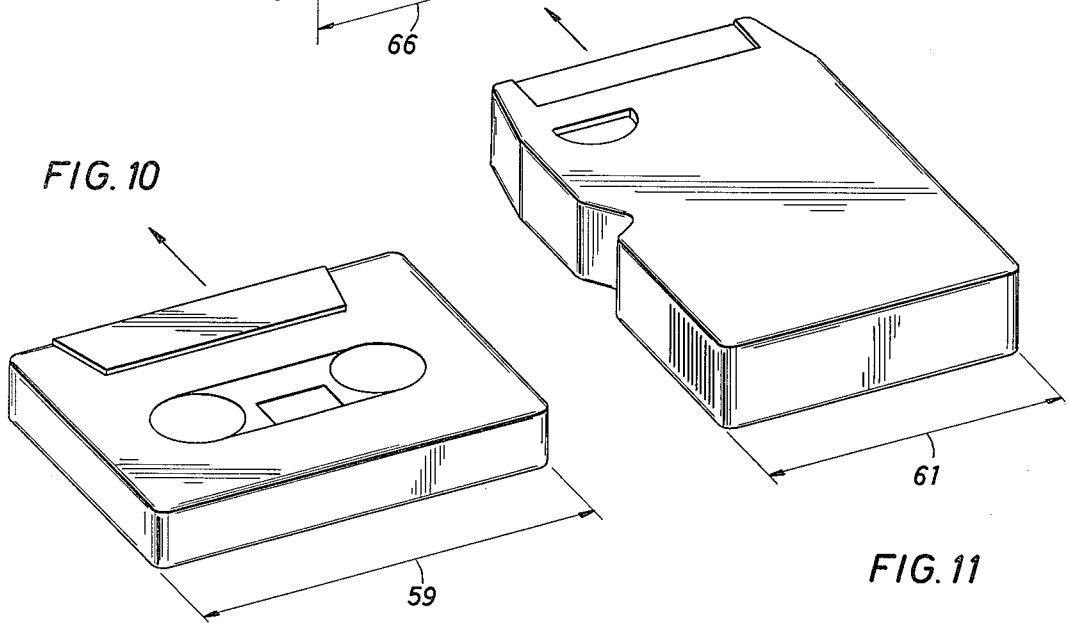
FIG. 10
FIG. 11
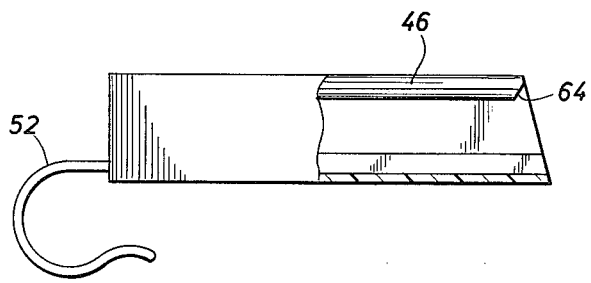
FIG. 8
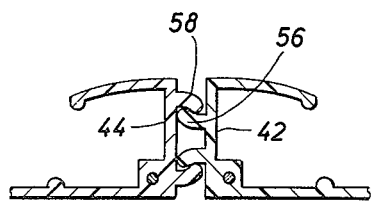
FIG. 9

VISOR-CONNECTED TAPE CARTRIDGE HOLDER

This is a continuation-in-part application of patent application Ser. No. 913,806, filed June 8, 1978, now abandoned.

BACKGROUND OF THE INVENTION

1. Field of the Invention

This invention pertains to storage of tape cartridges and more specifically to the storage of such cartridges in a motor vehicle in an organized fashion without taking up room in the glove compartment, the only usual storage area within the location of the vehicle operator.

2. Description of the Prior Art

With the advent of inexpensive tape cartridge players for motor vehicle use, either as a component part of a built-in entertainment system, a system not built-in but installed by the operator or portable players merely placed on the seat by the operator to listen to while in the vehicle, there has developed a need for storing tapes. The most common place is in the glove compartment of the vehicle. There are several drawbacks to the use of this storage area. First, the glove compartment is not always within easy reach of the operator. Second, the tapes are not stored in organized fashion. Third, they take up the room of the only storage place usually in the front seat, where maps, first aid kits and small tools are usually kept.

It is possible to use auxiliary trays or compartments designed primarily to hold drinks, tissue and the like. But, these do not organize the tapes. If placed forward on a panel console between bucket seats or the like, the unit may fit snugly under the dashboard, but tapes cannot be readily removed from the compartment.

Therefore, it is a feature of the present invention to provide improved tape cartridge storage facilities for vehicles, which facilities are capable of installation by the operator without special tools, and which do not interfere with the functions of the other parts of the vehicle in the front seat, such as the dashboard, glove compartment, radio, sun visor or the like.

It is another feature of the present invention to provide a vehicle with an improved tape cartridge storage means in the form of an inexpensive visor clamp so as to permit storage in a convenient place without interfering either with the comfort of the operator or passengers or taking up the storage space of the glove compartment.

It is yet another feature of the present invention to provide a vehicle with an improved tape cartridge storage means in the form of an inexpensive visor clamp suitable for storing either a standard cassette or a standard 8-track tape cartridge.

It is still another feature of the present invention to provide a vehicle with an improved tape cartridge storage means in the form of an inexpensive visor clamp which can readily be attached to other such clamps for storing a plurality of such cartridges.

It is yet another feature of the present invention to provide a vehicle with an improved tape cartridge storage means in the form of an inexpensive visor clamp for holding a plurality of tape cartridges and which provides a separate sun screen that is operable independently of the visor.

SUMMARY OF THE INVENTION

The invention herein described is either a normally extruded or injection molded plastic holder for attaching to a sun visor of a vehicle and providing a storage compartment normally on the top side thereof without interfering with the normal function of the visor. In many embodiments, flexible embracing ends of the holder grip the inserted tape cartridge. Another embodiment employs a leaf spring or the like to securely clamp within the holder, even though from one cartridge to the next the thickness dimension may vary greatly. One embodiment provides an adjustable metal clamp for securing the holder to visors of varying widths and thicknesses. Another embodiment uses an auxiliary plastic portion for securing to the visor. An auxiliary, independently pivotal sun screen is also provided in yet another embodiment.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings:

FIG. 1 is an oblique pictorial view of one embodiment of the present invention.

FIG. 2 is an oblique view of the inside of a vehicle showing the invention as embodied in two different sizes and attached to a sun visor.

FIG. 3 is the side view of the embodiment of the present invention shown in FIG. 1.

FIG. 4 is the side view of the embodiment shown in FIG. 3 being loaded.

FIG. 5 is the side view of an alternate embodiment of the present invention.

FIG. 6 is an oblique pictorial view of yet another embodiment of the present invention.

FIG. 7 is an oblique pictorial view of still another embodiment of the present invention.

FIG. 8 is a partial side view of the front edge of the embodiment of the invention shown in FIG. 7.

FIG. 9 is a partial front view of the interlocking feature of two adjacent structures such as shown in FIG. 7.

FIG. 10 is a standard cassette tape cartridge positioned for insertion into the embodiment of the invention shown in FIG. 7.

FIG. 11 is an 8-track tape cartridge positioned for insertion into the embodiment of the invention shown in FIG. 7.

DESCRIPTION OF THE ILLUSTRATED EMBODIMENTS

Figure 12:
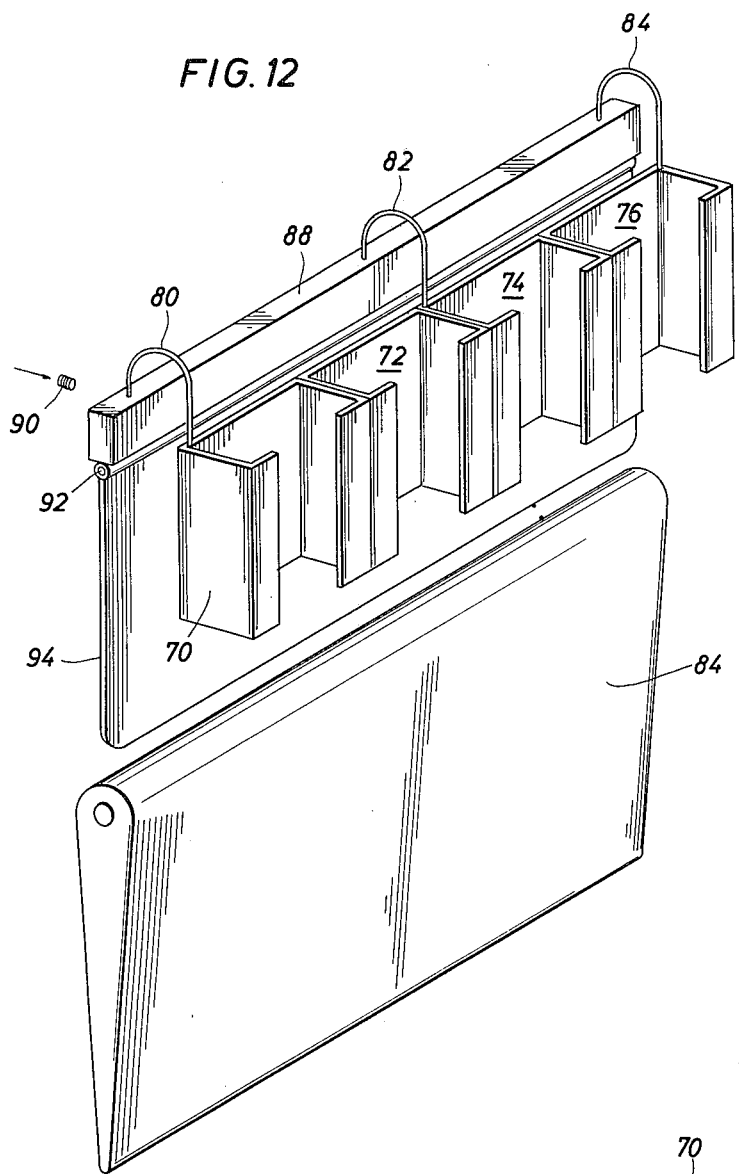
FIG. 12 is an oblique pictorial view of yet another embodiment of the present invention, this embodiment including an auxiliary sun screen.

Now referring to the drawings and first to FIG. 1, a pictorial view of one embodiment of the present invention is shown. As is evident, this embodiment is constructed either by way of an extrusion process or by injection molding.

FIG. 2 illustrates the embodiment of FIG. 1 in two convenient sizes. Clamp 10 is dimensioned to accommodate and hold a self-contained 8-track tape cartridge. One popular 8-track tape cartridge measures approximately 5-3/16 inches. Other popular 8-track tape cartridges are at least within 1/16 inch of that dimension and, therefore, a clamp 10 having a size to receive this dimensioned cartridge and having the other characteristics of the invention described more fully hereinafter will satisfactorily hold the majority of the 8-track tape cartridges on the market today.

Clamp 12 is dimensioned to accommodate and hold the case of the popular "cassette" tape cartridge. The elongated dimension of the case of one well-known brand of cassette cartridges measures 4¼ inches. Other known cassette cartridge cases are dimensioned very close to the same length. Therefore, a clamp 12 having a size to receive such a cartridge length and having other characteristics of the invention described more fully hereinafter will satisfactorily hold the majority of the cassette cartridge cases on the market today. The reason that it is desirable to dimension clamp 12 to receive the case for cassette cartridge, rather than for the cartridge itself, is that an exposed cassette cartridge tends to quickly become contaminated with dust, thereby becoming unsatisfactory unless kept in its dust-free case. Hense, as used herein, when it is stated that a holder is suitable for holding a "cartridge", it is understood that, in the case of a cassette cartridge, the holder is sized or dimensioned normally for the tape cartridge case and not just the cartridge without its case.

A first embodiment of either sized clamp 10 or clamp 12 is illustrated in FIG. 3. The clamp is made of slightly flexible plastic, such as PVC, having an overall elongate dimension. Near the front or leading edge 14 of visor 16 is a Y-type division. One division part 18 curves downwardly over edge 14 and then inwardly ending in edge 20 against the underneath side of visor 16. Since the formation of part 18 secures the clamp to the visor without any assistance from other clamp parts, the formation is such that edge 20 extends fairly far back from leading edge 14 of the visor.

Dimension part 22 extends upwardly and inwardly so as to provide a receiving wedge-like dimension for leading edge 24 of the tape cartridge 26. (As indicated above, it is understood that in the case of a clamp for holding a cassette tape cartridge, "tape cartridge 26" includes the case for such cassette tape cartridge.) The curving or otherwise inwardly projecting dimension of part 22 starts from a location more toward the rear than part 18 and is smaller in size. The relative rearward position is such that when the visor is raised to nearly its fully raised position, there is little interference with the automobile headliner and the cartridge is hidden from view as much as possible. The relative sizing is merely because of the difference in size between the visor and the cartridge being held.

In very similar fashion to the front edge, an upwardly and inwardly projecting part 28 accommodates in wedge-like fashion rearward edge 30 of the tape cartridge.

To place the cartridge into the clamp just described, reference is now made to FIG. 4. Cartridge 26 is inserted so that its rearward edge 30 is slipped into the receiving part 28. In order to accomplish this, as edge 30 is inserted, the elongate clamp flexes at its rear end, in this case, along portion 32 thereof lying adjacent the top of the visor. This permits insertion to the degree that front edge 24 can be snapped past the inward projection of part 22 and wedged into place. The clamp is similarly flexed at the time of tape cartridge removal.

An alternate embodiment of the invention just described is illustrated in FIG. 5, wherein there are two major differences. First, the downwardly and inwardly projecting part that holds the front end of the visor does not end in an edge against the underneath surface thereof, but rather, the end bends slightly away from the visor so as to present a smoothly rounded clamp surface thereagainst. Second, in order to clamp the rear edge of the cartridge into the rear clamp portion of the clamp, the clamp is flexed at its rearward location in that part which is rearward of the rear edge of the cartridge. Actually, there is probably a slight flexing action in the portion of the visor adjacent the visor, as with the FIGS. 3-4 embodiment, but the primary flexing is in rearward surface 34.

As mentioned above, the clamp just described is preferably made from PVC, but alternate plastics having similar flexing characteristics are equally suitable.

Typically, the clamps are made via an extrusion process. However, injection molding is an equally available method of manufacture. As is readily apparent, the clamps can be cut following extrusion not only to accommodate a single tape cartridge, but more than one, and in fact, for someone interested in carrying a number of tapes for his tape library, essentially the entire surface area of both visors can each be covered by one or more of the tape-accommodating clamps heretofore described.

FIG. 6 illustrates another embodiment 10' of the invention wherein the rear end of the tape holding side of the holder also includes an end that is shaped to turn outwardly away from the tape cartridge surface. Also, it should be noted that the dimension may vary greatly in width. The FIG. 1 embodiment, as well as the other embodiments, is typically 1 inch to 3 inches wide for accommodating a single cartridge. But, like the embodiment shown in FIG. 6, the dimension could be several inches (even as long as the visor itself) to accommodate a number of cartridges.

Now referring to FIG. 7, another embodiment of the present invention is illustrated. The embodiment includes a base portion for lying adjacent the top of a vehicle visor and having connected thereto side end pieces 42 and 44 oppositely aligned to each other and being substantially mirror images of each other. Each end piece includes an inwardly turned end portion 46, which terminates in a rounded or beaded tip end for resiliently bearing against an inserted cartridge. It should be noted that an extruded or injected molded unit of the configuration just described tends to turn or curl downward at the edges of the end pieces.

Channels 48 and 50 are included in the holder unit, being located as part of the bottom portion and, respectively, attached to end pieces 42 and 44. The top parts of these channels provide small bearing surfaces for supporting the case of a tape cassette, as hereafter explained. The channels also are opened along their lengths to receive the end wires from wire clamp 52. Clamp 52 is typically made of steel and is black oxide coated or parkerized. The dimensions are such that a wire end fits into the channel opening in a press fit manner to provide adjustable positioning of the visor clamp with respect to bottom portion 40 of the unit. It is apparent that the clamp portion between the end hooks over the visor and is suitable for spreading or capable of being pinched thereof depending on the visor thickness. The adjustment in direction 54 in the direction of entry of the wire end in the channel opening allows the holder to be positioned on the top of the visor so as to accommodate the tape cartridge with minimum interference between the vehicle headliner and visor.

External to the end pieces are runners for attaching one holder segment to another contiguously positioned thereto on the top of a visor. Again referring to FIG. 7, a pair of parallel runners 56 are attached lengthwise to end piece 42, the runners being slightly outwardly turned from each other. A pair of parallel runners 58 are similarly attached lengthwise to end piece 44, the runners being slightly inwardly turned toward each other. A first holder segment can be attached to an adjacent holder segment by longitudinally running the mating runners together or, alternately, by snapping the runners together, there normally being enough flex in the materials to permit this. The final mating of joined-together holder segments is shown in FIG. 9.

As previously mentioned, a standard cassette cartridge is stored in its case to protect the tape against dust, moisture and the like. The cases measure about $4\frac{1}{4}$ inches long within about 1/16 of an inch. To insert a cassette into a holder or holder segment, as illustrated in FIG. 7, the cassette is pressed in so that the long dimension 59 is sideways to the direction of insert. The case rides on top channels 48 and 50 and is clamped or held by the resiliency of downwardly bearing end pieces 46.

The widest part 61 of the width of an 8-track cartridge is about 4 inches, or about $\frac{1}{4}$ inch less than the length of a standard cassette cartridge case. FIG. 11 shows the direction of insert of an 8-track cartridge within the holder illustrated in FIG. 7. The 8-track cartridge is inserted to that its width dimension is sideways to the direction of insert. It is positioned between channels 48 and 50. However, additional channels 60 and 62 formed in the base portion of the holder provide the small bearing surfaces to permit easy insertion and removal.

Note that additional ease of insertion is provided for both the cassette tape cartridge and the 8-track cartridge since the leading surface edge of the holder is trimmed backwards, as best shown in FIG. 8, and the leading edges of end pieces 46 are additionally trimmed back at tip surface edge 64. The trimming back may be by bevelling or rounding and is importantly provided at the leading edges of both channels and both inwardly turned end pieces to facilitate cartridge insertion.

Dimensionally, it has been found that overall length 66 of base portion 40 is preferably $4\frac{1}{2}$ inches long, internal dimension 68 between end pieces on top of channels 48 and 50 is preferably $4\frac{1}{3}$ inches long, the height 70 of the end pieces is 1 inch, and the depth 72 of the holder is 3 inches.

A wire travelling within the openings of channels 48 and 40 is preferably bent or otherwise provided to have a stop so that it stops about $\frac{1}{4}$ inch from the front of the channel when it is adjusted to be in its fullest insert position.

The wall thickness is about 1/16 to 3/32 inch. Channels 48 and 50 are approximately 5/16 inch square and the wire has a diameter of about 3/32 inch.

In the position of insert for the cartridges, the 8-track cartridge label is usually on the end and readily visible when the visor is upwardly rotated in its stored position. The cassette cartridge titles are visible when the visor is rotated downwardly.

Now referring to FIG. 12, yet another embodiment of the invention is illustrated. This embodiment includes four holder segments 70, 62, 74 and 76, as illustrated in FIG. 7, joined together by the runners along the external side of their respective end pieces. The clamp configuration, however, is not the same.

Operating within every other channel opening is a steel wire 80, 82 and 64, each of these wires being shaped to fit over the back of sun visor 86. The wires fit into or attach to bar 88 running the length of the visor. Set screws 90 permit easy attachment.

Figure 13:
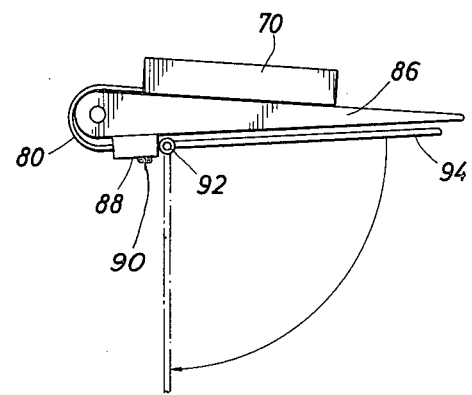
FIG. 13 is a side view of the embodiment shown in FIG. 12, with the sun screen in its lowered position.

A piano hinge 92 permits attachment of a smoked sun screen to bar 88. In use, the holder segments are attached to visor 86 and are positioned on top of the visor. When the visor is in its up position, the sun screen may be either in its up position or independently rotated to the down position, as shown in dotted section in FIG. 13. Hence, the screen provides glare or light protection apart from the visor. The clamping of the holder segments to the visor is such that visors of varying dimensions may be attached to, as with the embodiment shown in FIG. 7. Operation of the sun screen is the same as with the visor, which is normally with a slightly flattened rod operating within an undersized hole.

Figure 14:
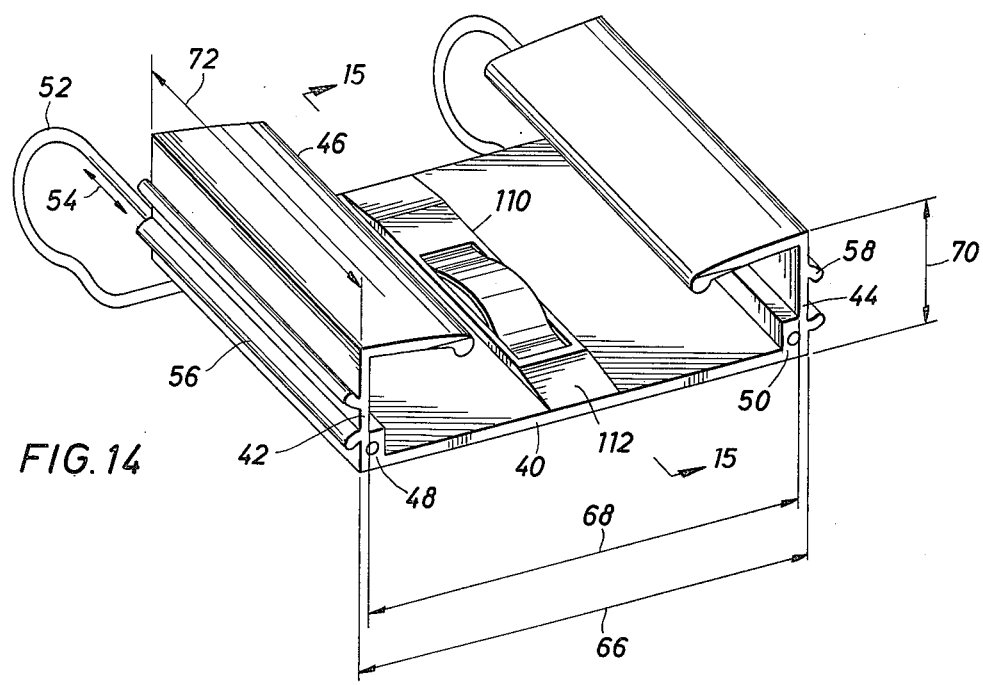
FIG. 14 is an oblique pictorial view of a preferred embodiment of the present invention.

Now referring to FIG. 14, a preferred embodiment of the present invention is illustrated. Except for the means for resiliently clamping the cartridge in location, the embodiment which is illustrated is similar to the embodiment shown in FIG. 7. Therefore, similar numbers to that embodiment are shown on the drawing.

However, channels 60 and 62 formed in the base portion of the holder illustrated in FIG. 7 do not appear and are not needed in the embodiment of the holder shown in FIG. 14.

Integrally formed in the inside surface of the base portion of the holder in FIG. 14 is a slotted segment 110 having a leading ramp 112 leading from the entry side of the holder to the highest dimension of the slotted segment.

Figure 15:
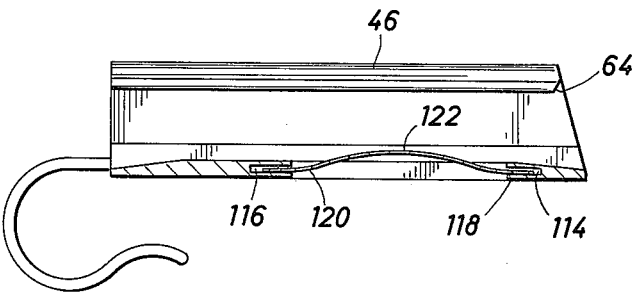
FIG. 15 is a cross sectional view taken at line 15—15 of the embodiment illustrated in FIG. 14.

Forward and rearward recesses 114 and 116, respectively, accommodate ends 118 and 120, respectively, of a leaf spring 122 resiliently operating within the slot. The spring is preformed so as to rise slightly above the slot, as best illustrated in FIG. 15. When a cartridge is inserted, it easily rides up the ramp across the leaf spring, thereby depressing the leaf spring, the leaf spring urging the cartridge upwardly against the tip ends of the inwardly projecting end of the holder. This means that holding of the tape cartridge is not dependent upon the resiliency of the ends of the holder, as previously discussed with the other embodiments.

Figure 16:
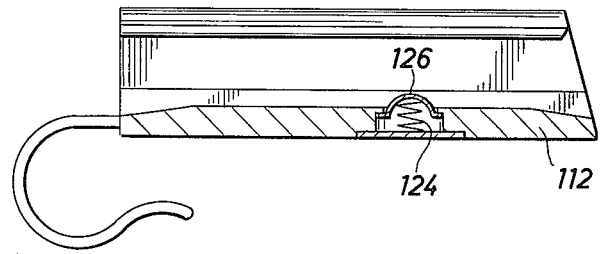
FIG. 16 is a cross sectional view of an alternate embodiment similar to that shown in FIG. 15.

FIG. 16 includes a compression spring 124 held in a slotted centrally located segment 112 in lieu of the leaf spring 122 shown in FIG. 15. Spring 124 operates a button 126 against the inserted cartridge in a manner similar to that described with respect to the leaf spring embodiment.

The embodiment which has just been described is readily formed by injection molding.

While particular embodiments of the invention have been shown and described, it will be understood that the invention is not limited thereto, since modifications may be made and will become apparent to those skilled in the art. For example, a single runner can be used to snap into or with respect to either one or two matingly accommodating runners. Also, instead of a flexible wiring arrangement for providing attachment to varying sizes of visors, it is possible to provide this attachment variation in other ways, such as by one or more adjustable set screws operating through accommodating internally threaded hole(s) in a solid clamp piece.

What is claimed is:

1. A holder for attaching to a vehicle sun visor and holding at least one tape cartridge therein, comprising;

a plastic clamp segment for lying adjacent the top of the visor, said segment including;

a base portion for lying along the visor, oppositely aligned, upwardly and inwardly turned wedging end pieces attached to said base portion, the dimension between said inwardly turned end pieces and said base portion accepting the tape cartridge, wherein said base portion includes at least two raised channels attached to said base portion within the dimension between said end pieces for supporting the tape cartridge within the holder and providing a reduced friction surface, wherein at least one of said raised channels includes an elongate opening therethrough, and including a wire press fitted into said opening for elongate adjustable positioning, said wire being curved to overlappingly and resiliently clamp onto one of the edges of the visor, and universally accommodating clamping means connected to said base portion to permit attaching of the holder to sun visors of varying thicknesses.

2. A holder for attaching to a vehicle sun visor and holding at least one tape cartridge therein, comprising;

a plastic clamp segment for lying adjacent the top of the visor, said segment including a base portion for lying along the visor, oppositely aligned, upwardly and inwardly turned wedging end pieces attached to said base portion, the dimension between said inwardly turned end pieces and said base portion accepting the tape cartridge, wherein said base portion includes at least two raised channels attached to said base portion within the dimension between said end pieces for supporting the tape cartridge within the holder and providing a reduced friction surface, wherein said raised channels are contiguous with the internal surfaces of said end pieces, the lateral dimension between the internal surfaces of said end pieces along the top of said raised channels accommodating the long dimension of a cassette cartridge, the lateral dimension between the internal surfaces of said raised channels accommodating the short dimension of an 8-track cartridge, and universally accommodating clamping means connected to said base portion to permit attaching of the holder to sun visors of varying thicknesses.

3. A holder in accordance with claim 2, wherein at least one of said raised channels includes an elongate opening therethrough, and including a wire press fitted into said opening for elongate adjustable positioning, said wire being curved to overlappingly and resiliently clamp onto one of the edges of the visor.

4. A holder in accordance with claim 3, wherein said base portion includes a second set of raised channels intermediate of said first-named channels.

5. A holder for attaching to a vehicle sun visor and holding at least one tape cartridge therein, comprising;

a plastic clamp segment for lying adjacent the top of the visor, said segment including a base portion for lying along the visor, oppositely aligned, upwardly and inwardly turned wedging end pieces attached to said base portion, the dimension between said inwardly turned end pieces and said base portion accepting the tape cartridge, said base portion includes a slotted segment having securing means therein, resilient means secured by said securing means and depressingly operating within said slotted segment and having a raised portion that projects above said slotted segment for urging the cartridge against the end pieces, said slotted segment including a ramp on the entry of said base portion as a convenience guide to assist the entry of the cartridge into the holder, and universally accommodating clamping means connected to said base portion to permit attaching of the holder to sun visors of varying thicknesses.

* * * * *